June 27, 1950 E. J. SIMANEK 2,512,687
RAILWAY BRAKE ARRANGEMENT
Filed April 2, 1947 3 Sheets-Sheet 1

INVENTOR.
Edward J. Simanek
BY
[signature] Atty.

June 27, 1950          E. J. SIMANEK          2,512,687

RAILWAY BRAKE ARRANGEMENT

Filed April 2, 1947          3 Sheets—Sheet 2

INVENTOR.
Edward J. Simanek
BY
Ann O. B. Garner
Atty.

INVENTOR.
Edward J. Simanek
BY
Orrin O B Garner
Atty.

Patented June 27, 1950

2,512,687

UNITED STATES PATENT OFFICE 2,512,687

RAILWAY BRAKE ARRANGEMENT

Edward J. Simanek, Chicago, Ill., assignor to American Steel Foundries, Chicago, Ill., a corporation of New Jersey Application April 2, 1947, Serial No. 738,897

12 Claims. (Cl. 188—46)

My invention relates to railway brake equipment and more particularly to a braking mechanism for a six-wheel truck.

An object of the invention is to devise a brake mechanism especially adapted for a truck such as described wherein a unified structure of brake rigging is afforded each side of the truck, each brake rigging structure being actuated by a plurality of power cylinders connected in tandem and carried on the adjacent ends of the transverse bolsters outboardly of said truck.

Another object of the invention is to devise a compact brake rigging system which is of simple design and efficient in service and in which the power cylinders are so disposed as to be readily accessible for any purpose desired.

A further object of the invention is to devise a brake arrangement for a car truck wherein the cylinders are carried on the ends of the transverse bolsters of the car truck outboardly of said truck, the cylinders on each side of the truck being connected in tandem for simultaneous operation so as to develop the power required for effecting proper brake application.

These and other objects of the invention will be apparent from the specification and the drawings wherein parts shown in certain of the views are omitted where better shown in others for purposes of clarity.

Describing the structure in further detail, the car truck comprises, at each side thereof, oppositely arranged spaced side frames 2 and 4 (Figure 1A) connected at their adjacent ends in a well known manner by means of equalizers (not shown) affording the usual connection for journal boxes (not shown) connected to the intermediate wheel and axle assembly 6.

The remote ends of the frames 2 and 4 are formed with pedestals 8, 8 and 10, 10 respectively for association with journal box means (not shown) to which are journaled respective wheel and axle assemblies 12 and 14 at the opposite ends of the truck.

Figure 4:
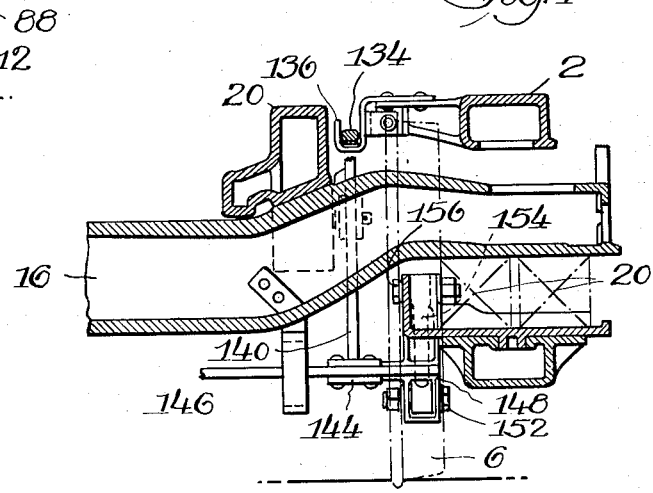
Figure 4 is a sectional view of the structure taken in the transverse vertical plane substantially as indicated by line 4—4 of Figure 1A with the cylinder and mounting bracket therefor removed.

At opposite sides of the transverse center line of the truck are positioned transverse bolsters 16 and 18, the bolster 16 being associated with the frames 2 and spring-supported therefrom as by springs 20 diagrammatically illustrated in Figure 4, while the bolster 18 is spring-supported from the frames 4 in a similar manner.

On the transverse bolsters is seated a center bolster 20 having a center bearing 22 at its top for supporting the body of the vehicle (not shown), said center bolster also having at each end thereof a side bearing table 23 affording a support for a side bearing (not shown).

As is well known to those skilled in the art, the transverse bolsters and the center bolster may be formed as an integral structure.

Figure 1:
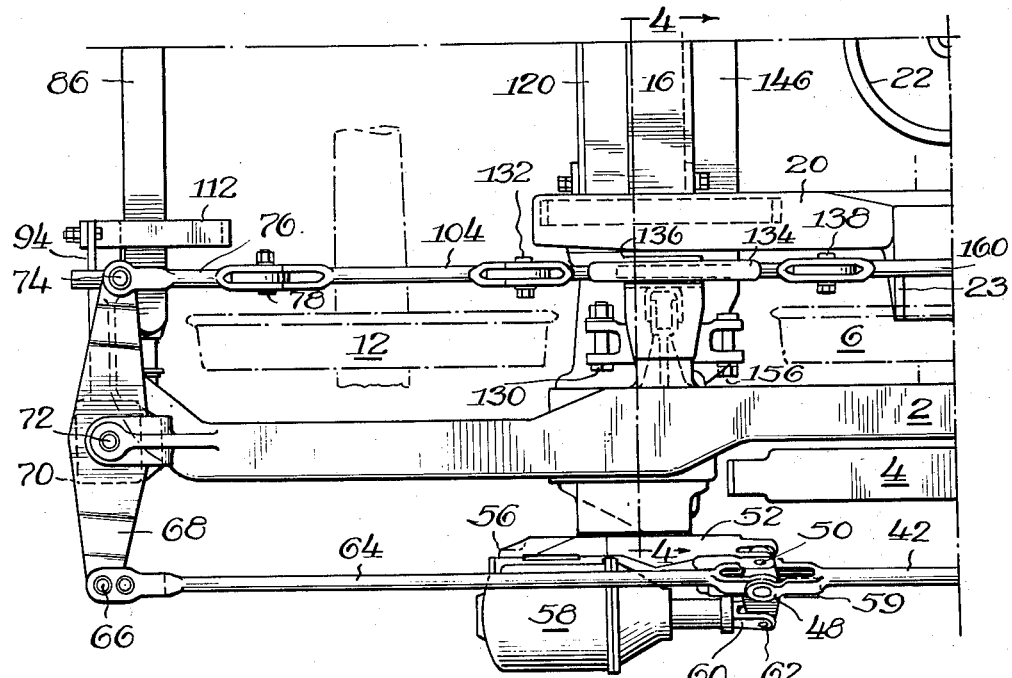
Figures 1 and 1A are top plan views at opposite sides respectively of the transverse center line of a truck structure embodying the invention, only one half of the structure being shown inasmuch as it is symmetrical about its longitudinal center line.
Figure 1A:
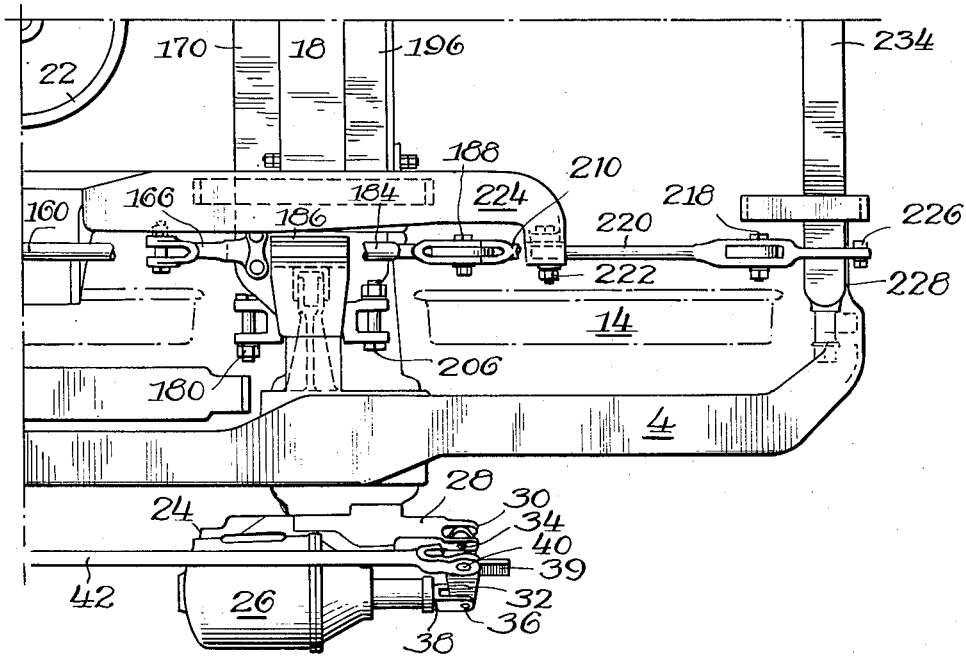

It will be observed that the ends of respective bolsters 16 and 18 project outboardly of the side frames in a manner as best seen in Figures 1, 1A and 4.

Figure 5:
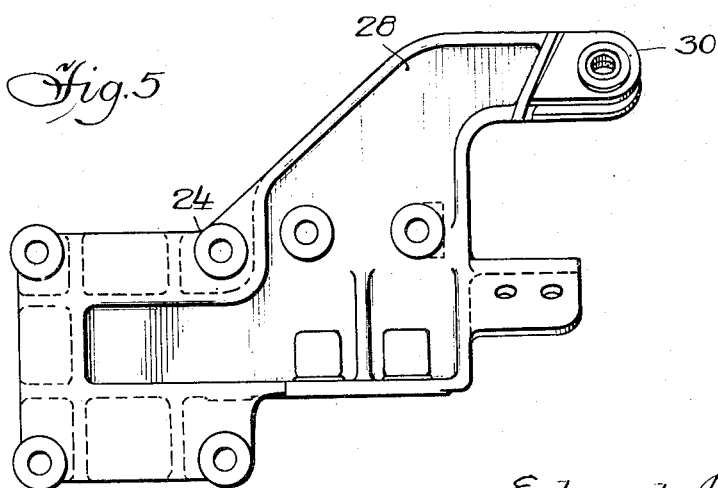
Figure 5 is a side elevation of one of the cylinder mounting brackets.

On each end of the transverse bolster 18 is secured a bracket 24 carrying at one end a power cylinder 26, said bracket being formed at its other end with a leg 28 extending above said cylinder, said leg being bifurcated at its end as at 30 defining a diagonal slot or fulcrum jaw into which projects the upper end of a diagonally disposed cylinder lever 32 pivotally secured at its upper end to said leg as at 34. The lower end of the cylinder lever 32 is pivoted as at 36 to a piston rod 38 of said cylinder 26. The bracket 24 is shown in detail in Figure 5. A support plate 39 seats against the inboard side of the lever 32 and is fixed to the bracket 24.

The cylinder lever 32 is pivoted intermediate its ends, as at 40, to one end of a pull rod 42, the other end of said rod being pivoted to a cylinder lever 44 as at 48 intermediate the ends thereof. The upper end of the cylinder lever 44 is pivotally secured as at 50 to a leg 52 of a bracket 56 fixed to the end of the transverse bolster 16. The bracket 56 is of a form substantially identical with that of the afore-mentioned bracket 24 and mounts below the upper level of the leg 52 thereof a power cylinder 58 comprising a piston with a rod 60 (Figure 1A) pivoted as at 62 to the lower end of the cylinder lever 44. The cylinder lever 44 seats on its inboard side against a support plate 59 fixed to the bracket 56.

A pull rod 64 is pivoted at one end thereof to the cylinder lever 44 at the point 48, and the other end of the pull rod is pivotally connected as at 66 (Figure 1A) to the outboard end of a horizontal dead lever 68. The lever 68 extends through a fulcrum jaw 70 formed on the end of the side frame 2 and is pivoted intermediate its ends as at 72 to said jaw 70.

The inboard end of the dead lever 68 is pivotally connected as at 74 to one end of a pull rod 76 which in turn in pivoted at its other end as at 78 to the upper end of a live truck lever 80 positioned adjacent one side of the end wheel and axle assembly 12. The lower end of the live lever 80 is fulcrumed as at 82 to a fulcrum 84 on a brake beam 86 (Figure 3). The brake beam 86 comprises at each end thereof a trunnion 88 which is pivotally connected to the lower end of a brake hanger 90, the upper end of said brake hanger 90 being pivotally suspended as at 92 (Figure 3) from an inturned end portion 94 of the side frame 2. The hanger 90 at a point intermediate its ends, as at 96, pivotally carries a brake head 98 (Figure 2A) supporting a brake shoe 100 for association with the periphery of the adjacent wheel and axle assembly 12. The brake head is associated with a balancing device 102 of conventional design.

The lever 80 extends through a slot in a pull rod 104 and is afforded intermediate its ends an adjustable pivotal connection to said rod as at 106. The rod 104 extends at one end through an aperture 108 in the inturned end portion 94 and is slidably supported by said end portion as at 110 (Figures 2A and 3). The inturned end portion 94 also carries a safety loop 112 passing under the brake beam 86. The other end of the pull rod 104 passes over the axle of the adjacent wheel and axle assembly 12 and is pivoted to a live lever 114 intermediate its ends as at 116, the lower end of the brake lever 114 being pivotally connected to a fulcrum 118 on a brake beam 120 carrying at each end thereof a brake head 122 with a brake shoe 124 for braking engagement with the adjacent side of the wheel and axle assembly 12. To the brake head 122 is pivoted as at 126 the lower end of a hanger 128, the upper end of said hanger being pivoted to the frame 2 as at 130.

The upper end of the brake lever 114 is pivoted as at 132 to one end of a pull rod 134, said pull rod passing over and being guidably supported by a carrier 136 (Figures 1A and 4) fixed to the side frame 2 and projecting inboardly therefrom. The other end of the pull rod 134 is pivotally connected as at 138 to the upper end of a live truck lever 140 disposed adjacent one side of the intermediate wheel and axle assembly 6. The lower end of the truck lever 140 is pivoted as at 142 to a fulcrum 144 on a brake beam 146 carrying at each end thereof a brake head 148 with a brake shoe 150. The brake head 148 is pivotally secured as at 152 to the lower end of a brake hanger 154, the upper end of said brake hanger being fulcrumed to the frame as at 156.

The truck lever 140 is pivoted intermediate its ends as at 158 to one end of a pull rod 160, said pull rod 160 passing over the axle of the adjacent wheel and axle assembly 6 and at its opposite end being pivoted as at 162 to a live truck lever 164 intermediate the ends thereof. The lower end of the live truck lever 164 is pivotally secured to a fulcrum 166 carried by a brake beam 170 on each end of which is mounted a brake head 172 with a brake shoe 174. To the brake head 172 as at 176 is pivoted the lower end of a hanger 178, the upper end of said hanger being pivoted as at 180 to the truck frame 6.

The live truck lever 164 is pivoted at its upper end as at 182 to one end of a pull rod 184, said pull rod 184 passing over a carrier 186 and guidably supported thereby, the carrier 186 being fixed to and projecting inboardly therefrom. The other end of the pull rod 184 is pivoted as at 188 to the upper end of a live truck lever 190 positioned adjacent one side of the wheel and axle assembly 14. The lower end of the live truck lever 190 is fulcrumed as at 192 to a fulcrum 194 on a brake beam 196 carrying at each end a brake head 198 with a brake shoe 200. To the brake head 198, as at 202, is pivoted the lower end of a hanger 204, the upper end of said hanger being pivoted to the frame 4 as at 206.

The lever 190 is pivoted intermediate its ends, as at 208, to one end of a pull rod 210 which passes over the axle of the adjacent wheel and axle assembly 14. The opposite end of the pull rod 210 is provided with a slack adjuster 212, said slack adjuster affording a fulcrum as at 214 for a dead truck lever 216 at a point intermediate its ends. The upper end of the dead truck lever 216 is fulcrumed as at 218 to a support member 220, intermediate its ends, said support member being connected at one end as at 222 to an extension 224 (Figure 1A) of the center bolster 20. The other end of the support member 220 is carried on and connected as at 226 to an inturned end 228 of the side frame 4. The lower end of the dead truck lever 216 is fulcrumed as at 230 to a fulcrum 232 on the brake beam 234, said brake beam being formed at each end with a trunnion 236 to which is pivoted the lower end of a hanger 238, the upper end of said hanger being pivoted as at 240 to the inturned end 228 of the side frame 4.

On the hanger 238, intermediate its ends, as at 242 is pivoted a brake head 244 with balancing means 246 of conventional form, said brake head carrying a brake shoe 248 for association with the periphery of the wheel of the adjacent assembly 14.

Figure 2:
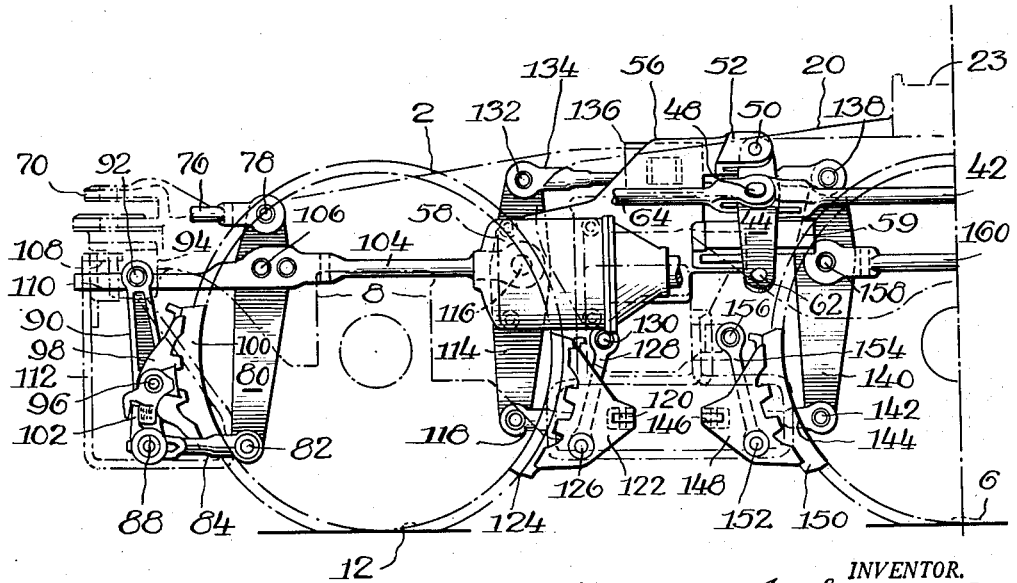
Figures 2 and 2A are side elevations of the truck structure shown in Figures 1 and 1A.
Figure 2A:
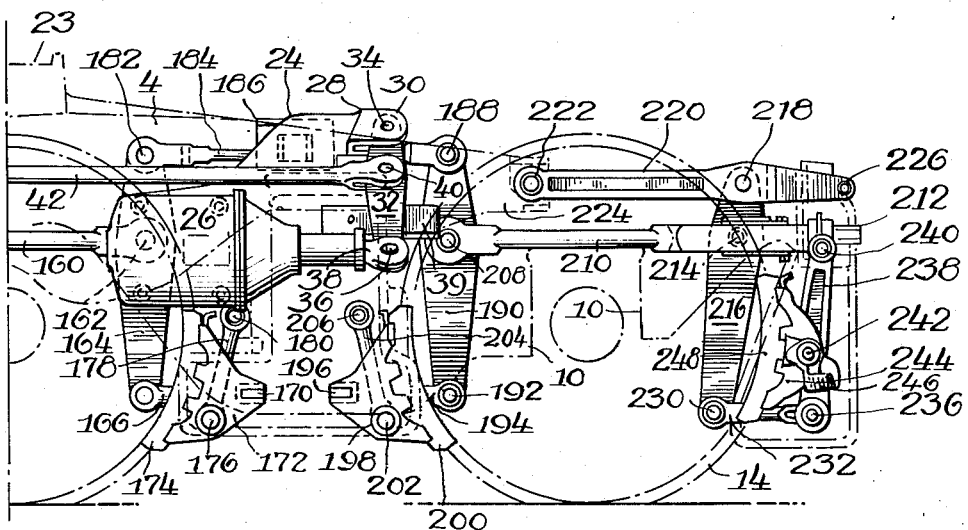
Figure 3:
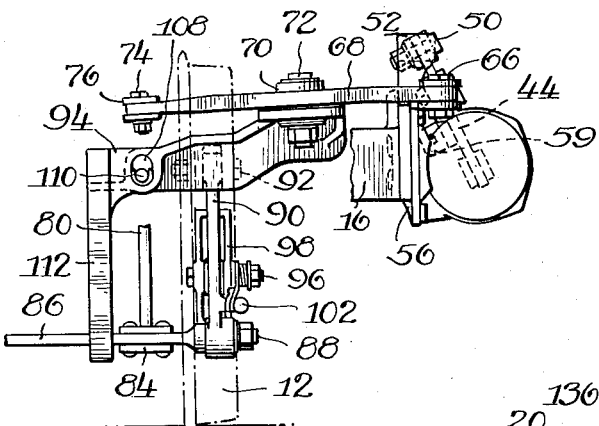
Figure 3 is an end elevation of said structure taken from the left, as seen in Figures 1A and 2A.

In operation, to apply the brakes, the cylinders 26 and 58 are caused to actuate the levers 32 and 44, respectively, rotating the same in a counterclockwise direction (Figures 2 and 2A), thus causing the rod 42 to move to the right (Figures 2 and 2A). This movement in turn results in the rod 64 also moving to the right, rotating the dead lever 68 in a counterclockwise direction (Figure 1) about its fulcrum 72, causing the inboard end of the dead cylinder lever 68 to move to the left, pulling with it in the same direction the pull rod 76 which in turn causes the lever 80 to pivot about its fulcrum 106 on the rod 104 in a counterclockwise direction (Figure 2) which urges the brake shoe 100 against the periphery of the wheel and axle assembly 12. Simultaneously, the lever 80 moves the pull rod 104 to the left (Figure 2) causing the lever 114 to also be pulled in the same direction and thereby rotated in a clockwise direction to apply the shoe 124. The lever 114, in moving towards the left, pulls the rod 134 in the same direction which in turn pulls the lever 140 toward the left and at the same time rotates the lever 140 in a counterclockwise direction, applying the shoe 150 to the periphery of the wheel of the assembly 6. Movement of the lever 140 to the left causes similar movement of the rod 160 which in turn pulls the lever 164 to the left and causes the same to rotate in a clockwise direction, applying the brake shoe 174 to the wheel and axle assembly 6. The movement of the lever 164 to the left imparts a similar movement to the rod 184 which in turn causes the lever 190 to rotate in a counterclockwise direction and also move to the left, thus applying the brake shoe 200 to the periphery of the wheel of the assembly 14. Actuation of the lever 190 moves the rod 210 to the left which in turn rotates the lever 216 in a clockwise direction, applying the brake shoe 248 to the wheel of the assembly 14. Release of the power means will cause reversal of the movement heretofore described in applying the brakes.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a six-wheel car truck, a truck frame, spaced supporting wheel and axle assemblies, brake means for said assemblies including unified brake rigging dead-ended at one end of the truck and having a live end at the opposite end of the truck, a load-carrying structure spring-supported from the frame and having portions protruding outwardly of the frame beyond the outboard side thereof, said portions being spaced longitudinally of the truck, a power cylinder mounted on each portion, said cylinders being arranged to operate in the same direction longitudinally of the truck, a substantially vertical cylinder lever pivoted to each cylinder at its lower end and to the associated portion at its upper end, a pull rod interconnecting said cylinder levers, and an operative connection between one of said cylinder levers and the live end of said rigging.

2. In a brake arrangement, a truck framework including a side member, supporting wheel and axle assemblies, a pair of bolster members spaced longitudinally of the truck and each having an end protruding outboardly of said side member, a power cylinder mounted on each end, said cylinders being arranged to operate in the same direction, an upright cylinder lever associated with each cylinder and connected at its lower end thereto and pivoted at its upper end to the associated member, means interconnecting the cylinder levers at points intermediate the ends thereof, a unified brake rigging operatively associated with said assemblies and dead-ended at one end of the truck and having a live end at the other end of the truck, and an operative connection between one of said cylinder levers and said live end of the rigging.

3. In a railway car truck, a side frame, a bolster structure comprising spaced ends projecting through said frame, spring means between said ends and said frame for supporting said bolster structure, power means mounted on each of said ends outboardly of said frame, each of said power means comprising a cylinder having a piston rod and a lever pivotally connected to said piston rod at one end and fulcrumed at its other end to the associated bolster structure end, a link pivotally interconnecting said levers at points intermediate the ends thereof, and a brake-operating member operatively connected to said levers for actuation by all of said cylinders, said cylinders being arranged to operate in unison in the same direction.

4. In a brake arrangement, a truck frame including a side member, supporting wheel and axle assemblies, a load-carrying structure protruding through said side member at points spaced longitudinally of said side member, a plurality of cylinders arranged in tandem and mounted on said structure outboardly of said side member, said cylinders operating in the same direction toward one end of the truck, a substantially vertical lever positioned adjacent each cylinder and pivoted at its upper end to said structure and at its lower end to the adjacent cylinder, rigid means interconnecting the cylinder levers intermediate their ends, brake means for said assemblies, and means connecting one of said levers to said brake means at the point of connection of said one lever with said rigid means.

5. In a railway car truck, a framework including spaced side members, a load-carrying structure having ends protruding through said side members, a plurality of cylinders arranged in tandem mounted on each end, adjacent cylinders being arranged to operate in the same direction, means interconnecting adjacent cylinders comprising a lever adjacent each cylinder connected at its lower end to the associated cylinder and pivoted at its upper end to said structure, means interconnecting adjacent levers intermediate their ends, and a unified brake system on the inboard side of each member operatively connected to one of the adjacent levers.

6. In a railway car truck, a framework including a side member, a load-carrying structure comprising a plurality of elements projecting transversely through said side member, a power cylinder and a fulcrum member on the end of each element, said cylinders operating in the same direction, a lever hung from each fulcrum member at a point above the associated cylinder and connected to the associated cylinder at a point below the fulcrum member, means disposed above the cylinders at the outboard side of said side member and connecting respective levers to each other intermediate said first and second-mentioned points, and a brake-operating lever at one end of said truck connected to one of said levers at the point of connection of said means with said one lever.

7. In a railway car truck, a side frame, a bolster structure having spaced elements projecting laterally through said frame and spring-supported therefrom, cylinders on said elements outboardly of said frame, said cylinders operating in the same direction, a lever pivotally supported at one end from each element and operatively connected at its other end to the adjacent cylinder, and an operative connection between said levers and associated brake rigging.

8. In a brake arrangement, a truck framework, supporting wheel and axle assemblies, a load-carrying member, spaced cylinders carried on said load-carrying member and operating in the same direction, brake means for said assemblies including brake rigging dead-ended at one extremity of the truck and having a live end at the opposite extremity of the truck, and means including a system of interconnected levers connecting said cylinders to each other and to said live end of the rigging.

9. In a brake mechanism, the combination with a truck frame having side and transverse members, wherein said transverse member projects outwardly of said side member, spaced brake levers fulcrumed to said transverse member outboardly of said side member, brake cylinders carried by said transverse member and pivotally connected to respective levers, said cylinders operating in the same direction, a pull rod passing over one of said cylinders and connecting said levers at points intermediate the ends thereof whereby the same are caused to operate together, and an operative connection between one of said levers and associated brake rigging.

10. In a brake mechanism, the combination of a plurality of spaced brake cylinders mounted on an associated bolster structure and having piston rods, brake levers operatively connected at their lower ends to the piston rods of respective cylinders, each lever being fulcrumed at its upper end to said bolster structure, a link extending between and fulcrumed at its opposite ends to the medial portions of said levers, and another link connected to the medial portion of one of said levers and to associated brake rigging, said levers being movable in unison in the same direction by said power means.

11. In a railway car truck, a side frame, a bolster structure comprising a center piece and spaced transverse members, said members extending through said frame, spring means supporting said members on said frame, power cylinders fixed to the ends of said members outboardly of said frame, each cylinder having a piston rod, cylinder levers pivoted at one end to respective members, and at the other end to respective piston rods, and connected intermediate their ends to each other, and power-transmitting means connecting said levers with associated brake rigging, said power cylinders operating in the same direction.

12. In a brake arrangement for a railway car truck comprising a truck frame, a bolster resiliently supported therefrom, spaced wheel and axle assemblies, brake means for said assemblies, power means for actuating said brake means including spaced cylinders mounted on said bolster, levers pivoted at corresponding points to the bolster adjacent each cylinder and pivoted at other corresponding points thereto and operatively connected at still other corresponding points to each other and to said brake means.

EDWARD J. SIMANEK.

REFERENCES CITED

The following references are of record in the file of this patent:

UNITED STATES PATENTS

| Number | Name | Date |
|---|---|---|
| 1,939,926 | Schwentler | Dec. 19, 1933 |
| 2,149,496 | Baselt | Mar. 7, 1939 |
| 2,152,268 | Moeller et al. | Mar. 28, 1939 |
| 2,460,196 | Simpson | Jan. 25, 1949 |